J. A. McCLURG.
WRAPPER FOR CANDIES.
APPLICATION FILED JUNE 23, 1915.

1,174,593.

Patented Mar. 7, 1916.

Inventor
Jas. A. McClurg
By his Attorney
P. F. Bourne

UNITED STATES PATENT OFFICE.

JAMES A. McCLURG, OF MOUNTAIN LAKES, NEW JERSEY.

WRAPPER FOR CANDIES.

1,174,593.  Specification of Letters Patent.  Patented Mar. 7, 1916.

Application filed June 23, 1915. Serial No. 35,812.

*To all whom it may concern:*

Be it known that I, JAMES A. McCLURG, a citizen of the United States, and resident of Mountain Lakes, in the county of Morris and State of New Jersey, have invented certain new and useful Improvements in Wrappers for Candies, of which the following is a specification.

Candies on a stick, such as those commonly called "lollypops," so far as I am aware, have been wrapped in paper coverings by first laying the candy upon the paper, then folding the paper around the candy and twisting the paper around the junction of the candy with the stick. This manner of wrapping such candies entails the use of an excessive amount of paper, the wrapping is not as neat as desirable, and the covering has a tendency to become unwrapped.

The object of my invention is to provide an improved wrapping for such candies, wherein a saving can be effected in the amount of paper required for the wrappings, the wrapping of the candy may be effected with facility, and the wrapped candies are neat in appearance and not liable to become unfolded.

In carrying out my invention I provide paper wrappings of suitable dimensions with apertures or holes therein to receive the stick of the candy, whereby the paper may be folded over the candy in two piles, and the ends of the wrapping protruding from the candy may then be folded upon themselves over the candy, whereby the latter will be entirely covered and well protected, in a sightly and efficient manner.

Figure 2:
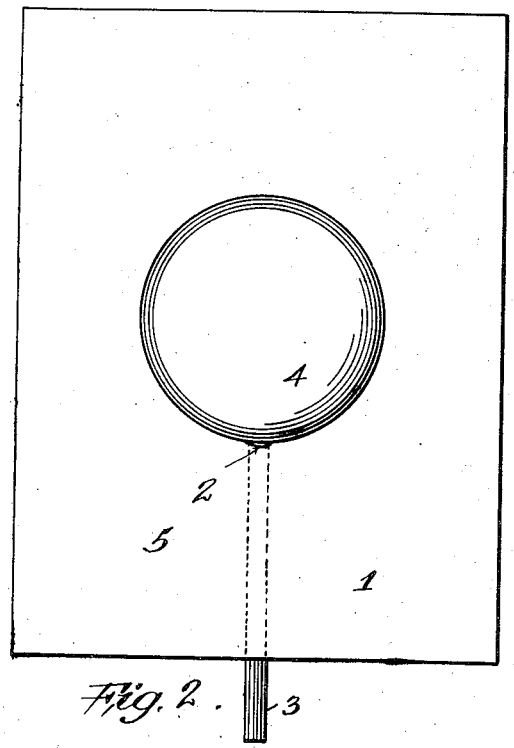
Figure 3:
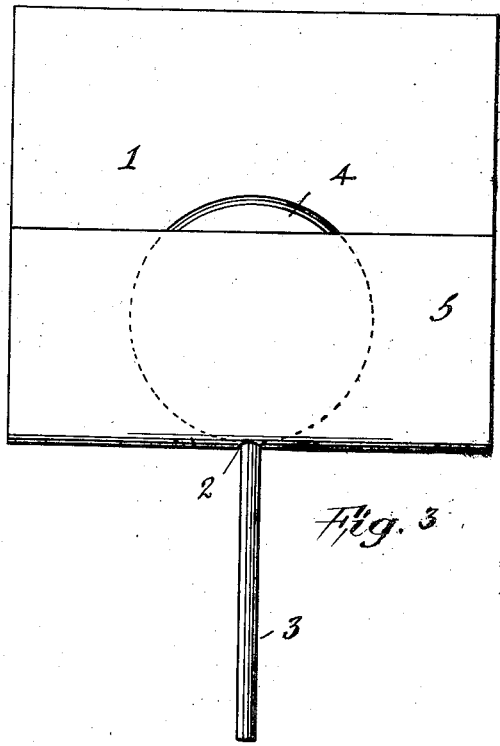
Figure 4:
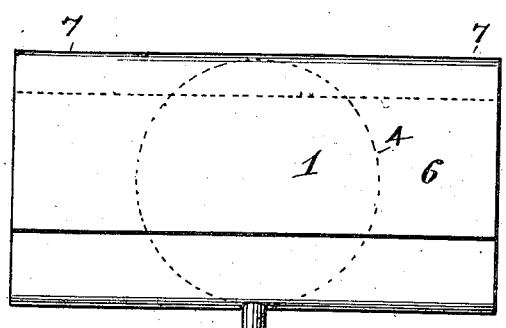
Figure 5:
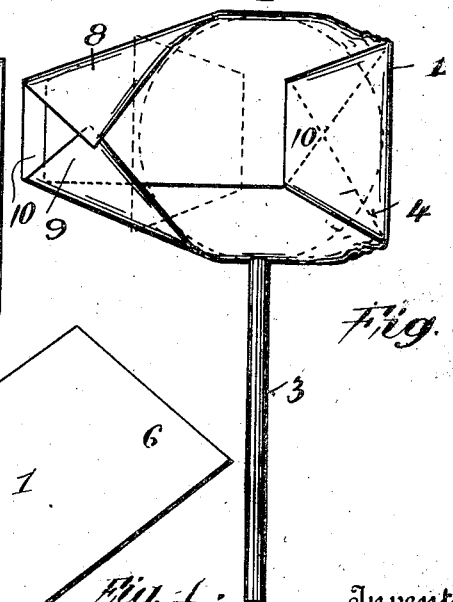
Figure 1:
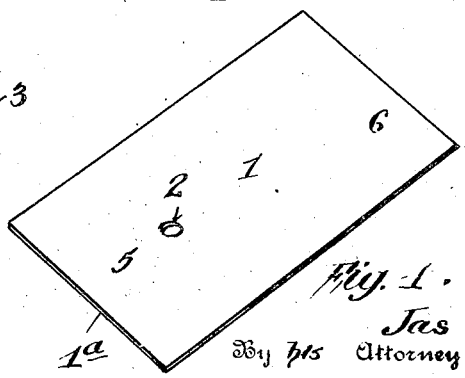

Reference is to be had to the accompanying drawings forming part hereof, wherein, Figure 1 is a detail of a candy wrapper embodying my invention; Fig. 2 is a face view illustrating the candy applied upon the wrapper, and Figs. 3, 4 and 5 illustrate further steps in wrapping the candy.

In accordance with my invention I provide a wrapper 1, such as a sheet of waxed paper, and I place an aperture or hole 2 in the wrapper adapted to receive the stick 3 of the candy 4, such as the stick of a lollypop. The aperture 2 is placed in the wrapper at an unequal distance from opposite ends, preferably at about one-third of the distance from one edge 1ª of the wrapper. The stick 3 is then passed through the aperture 2 of the wrapper, as illustrated in Fig. 2, and thereupon one portion of the wrapper is folded over the candy, such as the portion 5 between the edge 1ª and aperture 2, as illustrated in Fig. 3, and then the other or longer portion 6 of the wrapper is folded over the candy and upon the portion 5, as illustrated in Fig. 4. The laterally projecting end portions 7 of the wrapper then extending from the sides of the candy 4 substantially at right angles to the stick are folded preferably in the manner illustrated at the left side of Fig. 5, so that the substantially triangularly folded portions 8, 9, of the wrapper beyond the candy are overlapped against the main part 10 of the wrapper, and then such extended portions are folded over upon the candy, as illustrated in full and dotted lines in Fig. 5. The candy is thus inclosed in a substantially tight manner within the wrapper, to exclude dust, germs, etc., and to keep the candy fresh and clean.

By means of my improvements an economy in the amount of paper used for wrapping this class of candy is effected, the time required in wrapping the candies is economized, the wrapping is neat and attractive, and the wrapped candies may be readily and conveniently packed in cartons or boxes, and are not liable to become unwrapped, particularly where the folded over parts 10 of the wrappings are laid downward in the carton or box.

Having now described my invention what I claim is:—

1. The combination of a candy having a protruding stick, with a wrapper comprising a sheet of material having an aperture, the stick of the candy projecting through the aperture, the wrapper being folded over the candy.

2. The combination of a candy having a protruding stick, with a wrapper comprising a sheet of material having an aperture located at a distance from the center of the sheet, the stick of the candy projecting through the aperture, the portions of the wrapper at opposite sides of the candy being folded one upon the other over the candy, said folded side portions of the wrapper being folded over the main folded portions of the wrapper.

3. The combination of a candy having a protruding stick, with a wrapper comprising a sheet of material having an aperture located at a distance from the center of the sheet, the stick of the candy projecting through the aperture, the portions of the wrapper at opposite sides of the candy being folded one upon the other over the candy, said folded side portions of the wrapper extending laterally from the candy substantially at right angles to the stick having their corner portions folded over the body portions and such folded portions of the wrapper being laid over the candy.

Signed at New York city, in the county of New York, and State of New York, this 18th day of June, A. D. 1915.

JAMES A. McCLURG.

Witness:
OTTO F. ZIEGENBEIN.